(12) United States Patent
Kejser

(10) Patent No.: US 8,898,354 B2
(45) Date of Patent: Nov. 25, 2014

(54) METHODS AND DEVICES FOR SYNCHRONIZING TO A REMOTELY GENERATED TIME BASE

(75) Inventor: Keith Kejser, New Westminster (CA)

(73) Assignee: Icron Technologies Corporation, Burnaby (CA)

( * ) Notice: Subject to any disclaimer, the term of this patent is extended or adjusted under 35 U.S.C. 154(b) by 121 days.

(21) Appl. No.: 13/327,640

(22) Filed: Dec. 15, 2011

(65) Prior Publication Data

US 2013/0159569 A1     Jun. 20, 2013

(51) Int. Cl.
*G06F 5/00* (2006.01)
*G06F 15/173* (2006.01)

(52) U.S. Cl.
USPC ............... 710/60; 710/58; 710/61; 709/232; 709/233; 709/237

(58) Field of Classification Search
None
See application file for complete search history.

(56) References Cited

U.S. PATENT DOCUMENTS

| | | | | |
|---|---|---|---|---|
| 6,381,666 | B1 * | 4/2002 | Kejser et al. | 710/300 |
| 6,438,603 | B1 * | 8/2002 | Ogus | 709/233 |
| 7,177,793 | B2 * | 2/2007 | Barker et al. | 704/8 |
| 2003/0126514 | A1 * | 7/2003 | Shabbir Alam et al. | 714/43 |
| 2005/0147045 | A1 * | 7/2005 | Alam et al. | 370/236 |
| 2007/0201371 | A1 * | 8/2007 | Chou et al. | 370/237 |
| 2009/0067328 | A1 * | 3/2009 | Morris et al. | 370/230.1 |
| 2012/0060045 | A1 * | 3/2012 | Foster | 713/400 |
| 2012/0066418 | A1 * | 3/2012 | Foster | 710/61 |

\* cited by examiner

*Primary Examiner* — Michael Sun
(74) *Attorney, Agent, or Firm* — Christensen O'Connor Johnson Kindness PLLC

(57) ABSTRACT

Devices and methods for generating timing signals at a rate that matches a rate of remotely generated timing signals are provided. In some embodiments, a host generates timing signals in accordance with a USB specification, such as keep-alives, start-of-frame packets, or ITPs. An upstream facing port transmits the timing signals over a network to a downstream facing port. The downstream facing port generates and transmits timing signals to a USB device at a predetermined rate, and alters the predetermined rate based on an analysis of the rate at which timing signals are received from the upstream facing port.

18 Claims, 6 Drawing Sheets

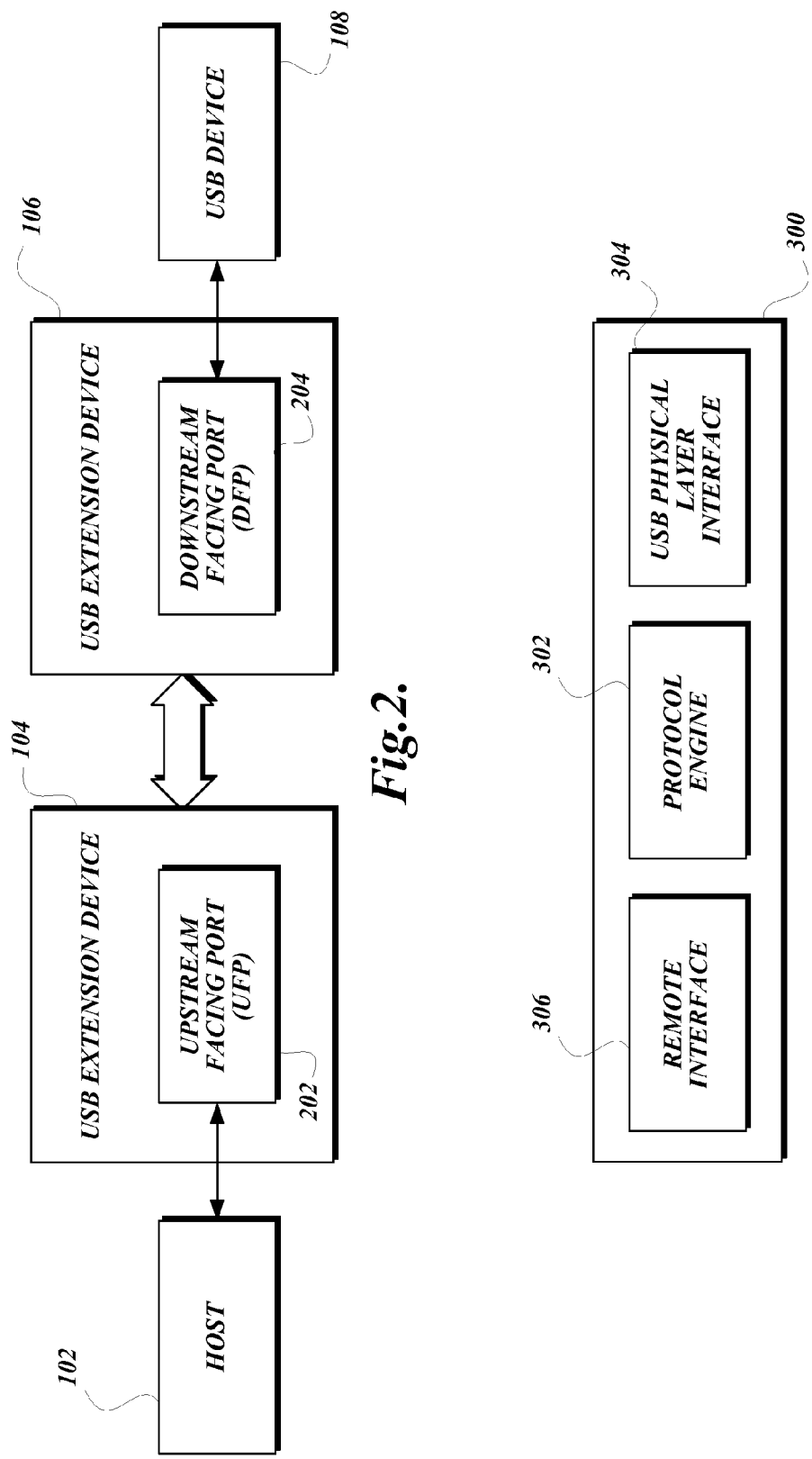

METHODS AND DEVICES FOR SYNCHRONIZING TO A REMOTELY GENERATED TIME BASE

BACKGROUND

USB is a peripheral interface for attaching a wide variety of computing devices, such as, for example, personal computers, digital telephone lines, monitors, modems, mice, printers, scanners, game controllers, keyboards, and the like. The specifications defining USB (e.g., Intel et al., Universal Serial Bus Specification, Revision 1.0, January 1996; updated as Revision 1.1 in September 1998; further updated as Revision 2.0 in April 2000; further updated as Revision 3.0 in November 2008, and subsequent updates and modifications—hereinafter collectively referred to as the "USB Specifications", which term can include future modifications and revisions) are non-proprietary and are managed by an open industry organization known as the USB Forum. The USB Specifications establish basic criteria that must be met in order to comply with USB standards. One of ordinary skill in the art will recognize many terms herein from the USB Specifications. Those terms are used herein in a similar manner to their use in the USB Specifications, unless otherwise stated.

It is a requirement of Revision 1.0 of the USB Specification that a single USB domain shall support up to 127 devices operating over a shared medium providing a maximum bandwidth of 12 Mbps. Revision 2.0 increases the maximum bandwidth to 480 Mbps while maintaining compatibility with devices manufactured under the criteria of Revision 1.1. Under Revision 3.0 of the USB Specifications, SuperSpeed connections are provided that use a 5 Gbps signaling rate. Under the USB Specifications, a host controller that supports a maximum signaling rate of 12 Mbps is referred to as a full-speed host. A host controller that supports a signaling rate of 480 Mbps is referred to as a high-speed host. A full-speed host controller conforming to the USB Specifications supports two classes of devices, namely, low-speed devices and full-speed devices. A high-speed host controller conforming to the USB Specifications supports three classes of devices, namely, low-speed devices, full-speed devices, and high-speed devices. Low-speed devices have a maximum signaling rate of 1.5 Mbps, full-speed devices have a maximum signaling rate of 12 Mbps, and high-speed devices have a maximum signaling rate of 480 Mbps. A SuperSpeed host controller conforming to the USB specifications supports all three earlier classes of devices, as well as SuperSpeed devices.

The USB Specifications provide strict timing guidelines for certain types of communication between a host controller and connected devices. For example, low-level signaling for bus events such as reset events, suspend events, and resume events are driven by signals that use timings that are, for example, shorter than 3 ms. Though the USB Specifications do not mandate any particular maximum cable length, the signaling rate and propagation speed of signals through copper wire limits a distance at which a round trip communication may comply with such timing.

Various methods have been disclosed for effectively overcoming these timing challenges to extend USB communication over longer distances, such as the devices and methods disclosed in commonly owned, co-pending U.S. patent application Ser. No. 13/229,583, incorporated herein by reference in its entirety for all purposes. Though such devices and methods are effective in establishing communication between a host and a USB device, differences in a rate of generation of start-of-frame packets by the host and a rate at which such packets are received by the USB device may cause difficulty when the USB device relies on receipt of such packets to establish a time base, such as for presenting streaming media and/or the like.

What is needed are devices and methods that allow start-of-frame packets to be received by the USB device at a rate that more accurately approximates the rate at which the start-of-frame packets are generated by the host.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a computing device configurable to provide a downstream facing port (DFP) for allowing a USB device to communicate with a host via an upstream facing port (UFP) is provided. The DFP is configured to receive a first remote timing signal from the UFP, transmit local timing signals to the USB device at a predetermined rate, and adjust the rate of transmission of local timing signals to the USB device based on further timing signals received from the UFP.

In some embodiments, a method of generating local timing signals is provided. The method comprises receiving a first remote timing signal, generating local timing signals at a predetermined rate, and adjusting the rate of transmission of local timing signals based on further received remote timing signals.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2 is a block diagram that illustrates further details of the upstream USB extension device and downstream USB extension device illustrated in FIG. 1;

FIG. 3 is a block diagram that illustrates an exemplary embodiment of a port device according to various aspects of the present disclosure;

DETAILED DESCRIPTION

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

Figure 1:
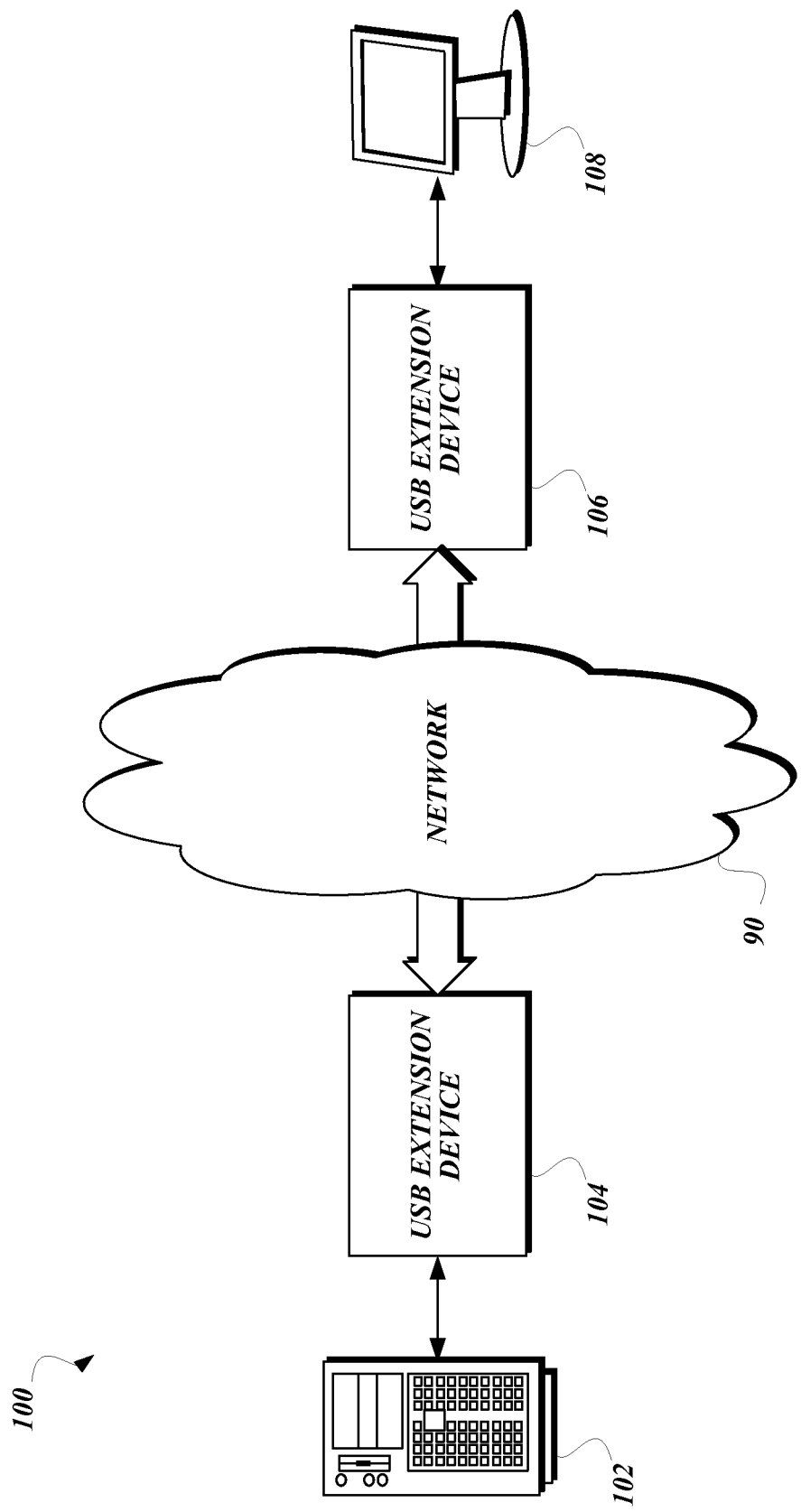
FIG. 1 is a block diagram that illustrates one embodiment of a system for extending USB communication according to various embodiments of the present disclosure.

FIG. 1 is a block diagram that illustrates one embodiment of a system 100 for extending USB communication according to various embodiments of the present disclosure. The system 100 includes a host 102 and a USB device 108. Traditionally, the host 102 and the USB device 108 would be directly connected via a USB cable, and would communicate directly with one another via a protocol that conforms to a USB specification, such as USB 1.0, USB 1.1, USB 2.0, or USB 3.0. As discussed above, such a connection would be limited to a short distance between the host 102 and the USB device 108 due to the timing requirements of the USB specification.

The host 102 may be any type of computing device containing a USB host controller. Some examples of suitable hosts 102 may include, but are not limited to, a desktop computer, a laptop computer, a tablet computing device, a server computer, a set-top box, an audio head unit for an automobile, an embedded host, and/or the like. Likewise, the USB device 108 may be any type of device capable of communicating via a USB protocol with a USB host controller. The example illustrated in FIG. 1 is a display device such as an LCD monitor, but some other examples of suitable USB devices 108 may include, but are not limited to, a loudspeaker, a human interface device such as a keyboard or mouse, a mass storage device such as a flash drive or external hard drive, a USB-capable medical device, a printer, a USB hub, a wireless controller, and/or the like.

In the present system 100, the host 102 is connected via a USB protocol to an upstream USB extension device 104, and the USB device 108 is connected via a USB protocol to a downstream USB extension device 106. The upstream USB extension device 104 and the downstream USB extension device 106 are communicatively coupled via a network 90 that may increase the distance between the host 102 and the USB device 108 beyond that supported by the USB specification. The network 90 and communication thereon may include any suitable networking technology, such as Ethernet, Bluetooth, WiFi, WiMax, the Internet, and/or the like, and any suitable communication medium, such as via physical cables, via wireless spectrum, and/or the like.

In some embodiments, the upstream USB extension device 104 and the downstream USB extension device 106 may happen to be closer to each other than the short USB requirement distance, and/or may be directly connected by a cable instead of via a network 90, but retain the capability of overcoming increased latency between the host 102 and the USB device 108 as described further below.

FIG. 2 is a block diagram that illustrates further details of the upstream USB extension device 104 and downstream USB extension device 106 illustrated in FIG. 1. The upstream USB extension device 104 includes an upstream facing port 202, and the downstream USB extension device 106 includes a downstream facing port 204. As used herein, the terms "upstream facing port" and the corresponding acronym "UFP" may be used interchangeably, as may the terms "downstream facing port" and the corresponding acronym "DFP." The UFP 202 is configured at least to communicate with the host 102 via a USB-standard-compliant protocol, and to exchange messages and USB bus traffic with the DFP 204. The DFP 204 is configured at least to communicate with the device 108 via a USB-standard-compliant protocol, and to exchange messages and USB bus traffic with the UFP 202.

The upstream USB extension device 104 and the downstream USB extension device 106 may contain further components such as a power supply, a status LED, a loudspeaker, an input device for switching between UFP functionality and DFP functionality, and/or the like. Since such components and their functions will be apparent to those of ordinary skill in the art, they have not been discussed further herein.

As illustrated in FIG. 2, the upstream facing port 202 of the upstream USB extension device 104 is connected to a downstream facing port of a host, and the downstream facing port 204 of the downstream USB extension device 106 is connected to an upstream facing port of a USB device 108. In other embodiments, the upstream facing port 202 of the upstream USB extension device 104 may be connected to a downstream facing port other than one provided by a host, such as a downstream facing port of a hub and/or the like. Likewise, in other embodiments, the downstream facing port 204 of the downstream USB extension device 106 may be connected to an upstream facing port other than one provided by a USB device 108, such as an upstream facing port of a hub and/or the like. The discussion below is primarily in terms of the simple topology illustrated in FIG. 2, but one of ordinary skill in the art will recognize that in some embodiments similar techniques may be used in other topologies without departing from the scope of the present disclosure.

FIG. 3 is a block diagram that illustrates an exemplary embodiment of a port device 300 according to various aspects of the present disclosure. In some embodiments, the port device 300 may be constructed to provide services of an upstream facing port 202, and in some embodiments the port device 300 may be constructed to provide services of a downstream facing port 204. In some embodiments, the port device 300 may include instructions to provide services of both an upstream facing port 202 and a downstream facing port 204, wherein the particular port services that are provided are determined by a user configuration such as a jumper switch, a firmware setting, a software setting, and/or the like.

As illustrated, the port device 300 includes a protocol engine 302, a USB physical layer interface 304, and a remote interface 306. In some embodiments, the protocol engine 302 may be configured to provide and/or execute the logic discussed below with regard to the UFP 202 and/or the DFP 204. The protocol engine 302 may instruct the USB physical layer interface 304 to apply the appropriate electrical signals to the USB physical layer in order to communicate with the USB device 108 or the host 102. Likewise, the protocol engine 302 may instruct the remote interface 306 to exchange information with the remote USB extension device.

In one embodiment, the protocol engine 302 may be implemented within a logic device such as a PLD, an ASIC, a FPGA, and/or the like. In other embodiments, the protocol engine 302 may be implemented within a computing device having at least one processor and a memory containing computer-executable instructions that, if executed by the at least one processor, cause the protocol engine 302 to perform the actions discussed below; a dedicated digital hardware device implemented, for example, as a state machine configured to perform the actions described; within an application specific processor; and/or within any other suitable computing device.

In some embodiments, logic of actions attributed to a USB extension device is executed by a protocol engine 302, which then instructs a USB physical layer interface 304 and/or a remote interface 306 to perform the appropriate communication steps associated with the logic. Throughout the discussion below, such actions may simply be described as being performed by the UFP 202 or the DFP 204 as if it was a single device for ease of discussion. One of ordinary skill in the art will recognize that actions attributed directly to the UFP 202 or the DFP 204 may actually be performed by a protocol engine 302, a USB physical layer interface 304, a remote interface 306, and/or some other component of the USB extension device.

In some embodiments, the UFP 202 and DFP 204 may be configured to operate in one of a plurality of modes, depending on the latency of the link between them. In a low latency mode, the UFP 202 and DFP 204 may be linked by a communication channel of adequate speed to support a SuperSpeed USB 3.0 connection simply by bridging USB packets across the communication channel. In a medium latency mode, the UFP 202 and DFP 204 may use a first technique to compensate for the delay in packet transmission between the UFP 202 and the DFP 204, and in a high latency mode, the UFP 202 and the DFP 204 may use a second technique to compensate for the delay in packet transmission. In some embodiments, the mode may be selected by a user while configuring the UFP 202 and the DFP 204. In some embodiments, the UFP 202 and DFP 204 may automatically determine a degree of latency between the devices and may automatically choose a mode based on that determination.

The USB Specifications state that timing signals (such as keep-alives, start-of-frame (SOF) packets, isochronous timestamp packets (ITP), and/or the like) should be generated by the host 102 and received by the USB device 108 at precise and stable intervals. For example, for low speed connections, a keep-alive signal is generated every 1 ms. As another example, for full speed connections, a SOF packet is generated and sent by the host every 1 ms to indicate the start of a new frame. As yet another example, for high speed connections, a SOF packet is generated and sent by the host every 1 ms to indicate the start of a new frame, and every 125 µs during a frame to indicate the start of a microframe. As another example, for SuperSpeed connections, an ITP is generated and sent by the host every 125 µs.

Given the regularity of transmission of the timing signals, a USB device 108 may use the timing signals as a time base. This may be useful in certain applications where it is important for the USB device 108 to process data received from the host 102 at the same or a similar rate at which it is transmitted by the host. For example, if multimedia is being streamed from the host 102 to the USB device 108 for presentation, it is important for maintaining a high-quality presentation by the USB device 108 that the multimedia data be presented at the rate at which it is transmitted from the host 102.

The USB Specifications allow some variation in the timing of these signals, and allow the timing of the signals to vary over time. For example, the SOF packet on a full speed bus may be sent every 1 ms±500 ns. As another example, the SOF packet on a high speed bus may be sent every 125 µs±0.0625 µs. Further, the rate of transmission may change by 16.6 ns every 1 ms. If these tolerances are not met, the USB device 108 may lose synchronization with the host 102 time base.

Transmission of the timing signals described above between an upstream facing port 202 and a downstream facing port 204 may be desired, as it may be desirable to inform the USB device 108 of variations in the timing signals generated by the host 102. However, transmission of the timing signals over the network 90 may introduce variable latency into the timing of receipt of the packets by the downstream facing port 204. Uncorrected, this may cause the timing signals to be relayed to the USB device 108 by the downstream facing port 204 at imprecise intervals.

Figure 4:
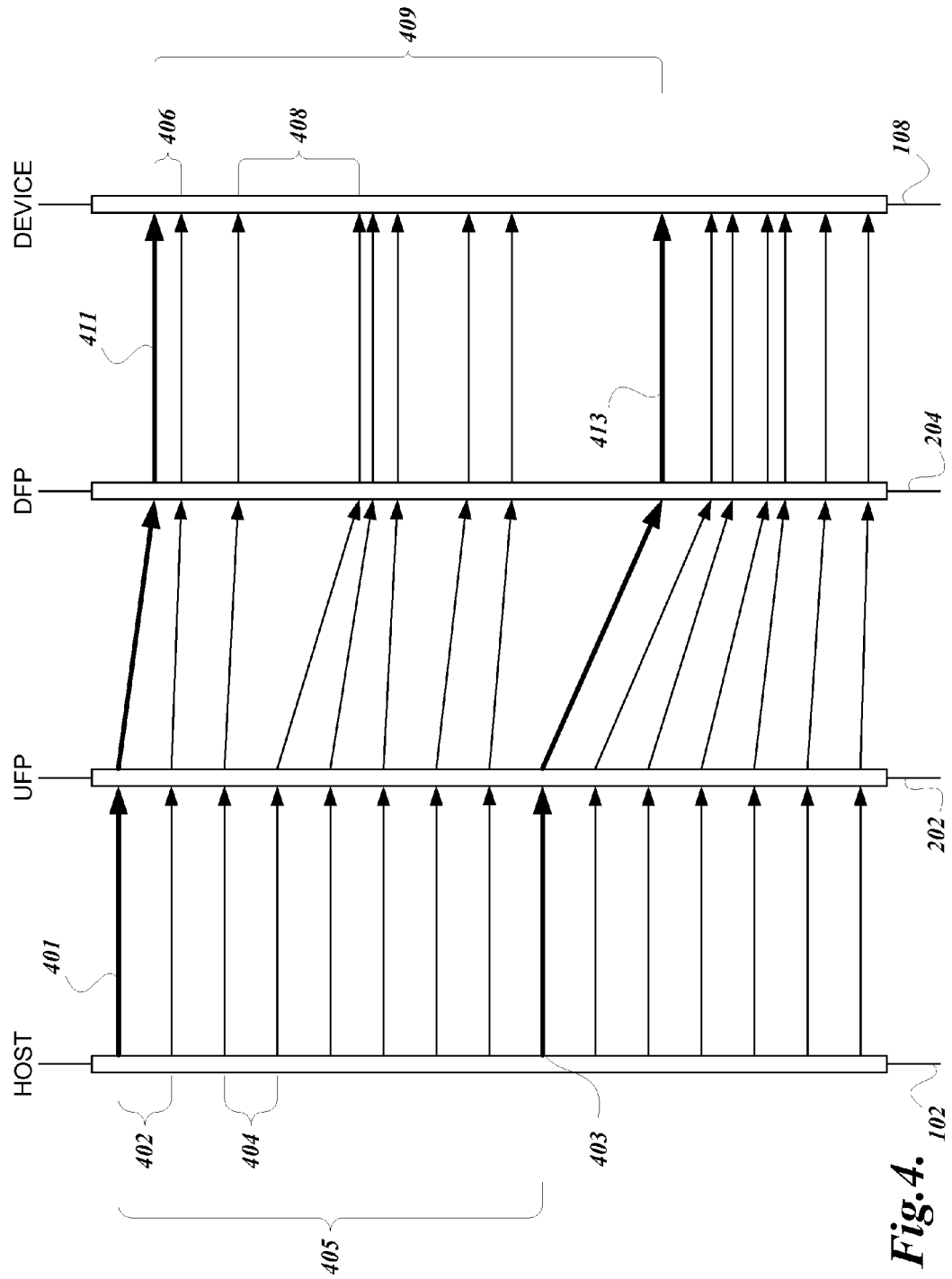
FIG. 4 is a sequence diagram that illustrates problems with variable latency between the upstream facing port and the downstream facing port.

FIG. 4 is a sequence diagram that illustrates problems with variable latency between the upstream facing port 202 and the downstream facing port 204. The diagram illustrates communication of timing signals between a host 102, an upstream facing port 202, a downstream facing port 204, and a USB device 108 as described above. The connection between the upstream facing port 202 and the downstream facing port 204 experiences variable latency over the network 90. The arrows indicate the transmission of timing signals from the host 102 to the USB device 108 via the upstream facing port 202 and the downstream facing port 204. A high-speed connection is illustrated with the bold arrows 401, 403 indicating start-of-frame packets transmitted by the host 102 at approximately 1 ms intervals to indicate the start of a new frame, and the normal arrows indicating microframe start-of-frame packets transmitted by the host 102 at approximately 125 µs intervals to indicate the start of a new microframe.

As shown by the sequence diagram, intervals between start-of-frame packets generated by the host 102 are approximately equal, such that, for example, an interval 402 between a first start-of-frame packet and a second microframe start-of-frame packet is approximately equal to an interval 404 between a third microframe start-of-frame packet and a fourth microframe start-of-frame packet. Likewise, an interval 405 between a start-of-frame packet 401 and a subsequent start-of-frame packet 403 is approximately equal to an interval specified in the USB specification, such as approximately 1 ms.

However, due to variable transmission delay between the upstream facing port 202 and the downstream facing port 204, the timing of the start-of-frame packets received by the USB device 108, if transmitted from the downstream facing port 204 upon receipt, is not retained. As shown, an interval 406 between a first received start-of-frame packet and a second received microframe start-of-frame packet, which should be approximately equal to the interval 402, is instead shorter, whereas an interval 408 between a third received microframe start-of-frame packet and a fourth received microframe start-of-frame packet, which should be approximately equal to the interval 404, is instead larger. Likewise, an interval 409 between a received start-of-frame packet 411 and a subsequent received start-of-frame packet 413 is larger. These changes in the intervals make the start-of-frame packets received by the USB device 108 unsuitable for establishing a time base.

Figure 5:
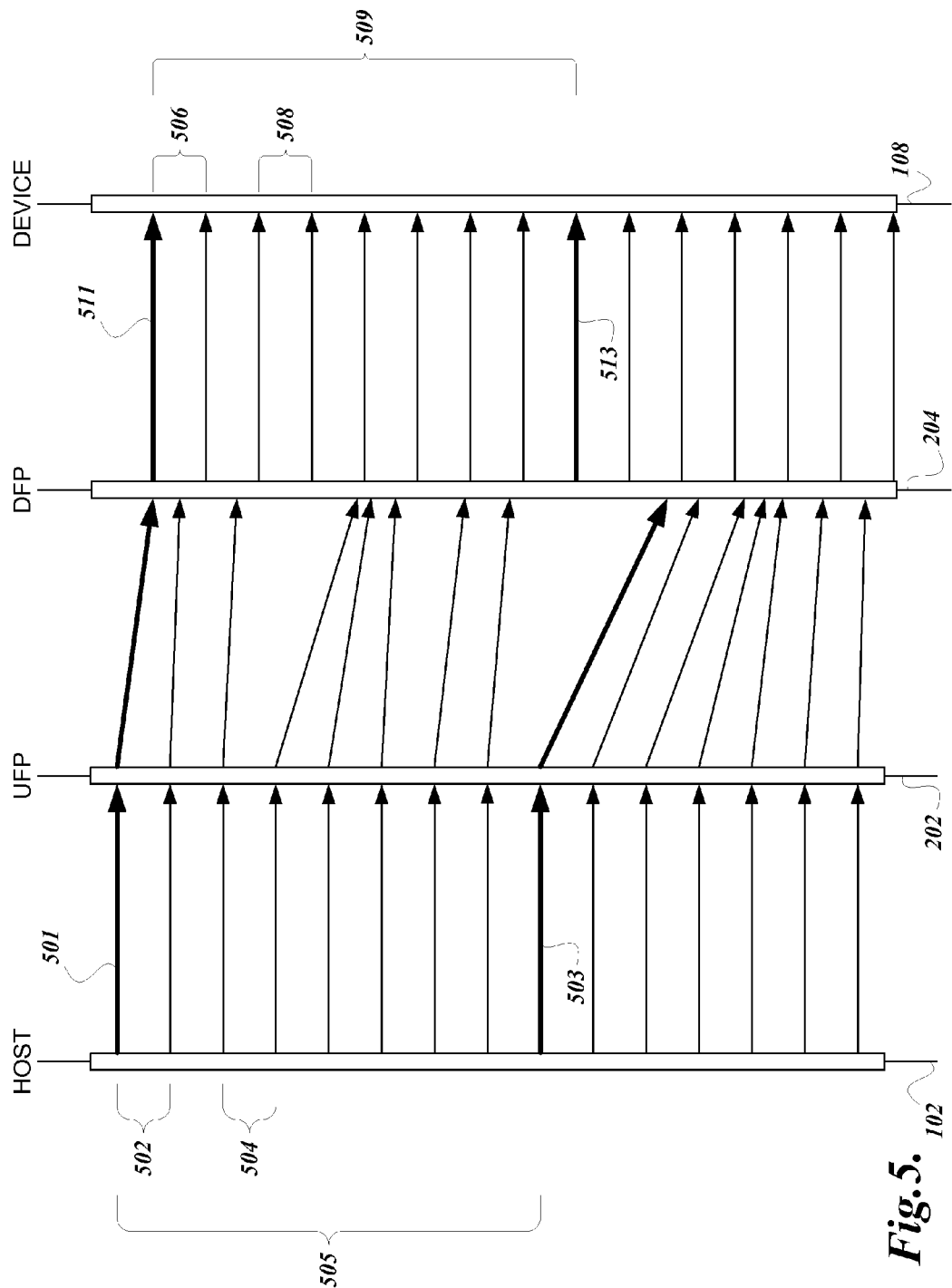
FIG. 5 is a sequence diagram that illustrates communication between a host and a USB device via an upstream facing port and a downstream facing port, according to various aspects of the present disclosure.

FIG. 5 is a sequence diagram that illustrates communication between a host 102 and a USB device 108 via an upstream facing port 202 and a downstream facing port 204 configured to overcome the problems discussed above, according to various aspects of the present disclosure. As in FIG. 4, the host 102 generates start-of-frame packets at a rate approximately equal to a rate described in the USB Specifications, and transmits them to the upstream facing port 202. The upstream facing port 202 transmits the start-of-frame packets to the downstream facing port 204 via the network 90. The start-of-frame packets again experience varying amounts of latency when traveling over the network 90 before arriving at the downstream facing port 204. However, the downstream facing port 204 is configured to perform various actions to recreate the rate at which the start-of-frame packets are generated by the host 102, such that an interval 502 between a first start-of-frame packet 501 and a second microframe start-of-frame packet is approximately equal to an interval 506 between a first received start-of-frame packet 511 and a second received microframe start-of-frame packet, an interval 504 between a third microframe start-of-frame packet and a fourth microframe start-of-frame packet is approximately equal to an interval 508 between a third received microframe start-of-frame packet and a fourth received microframe start-of-frame packet, and an interval 505 between a first start-offrame packet 501 and a subsequent start-of-frame packet 503 is approximately equal to an interval 509 between a first received start-of-frame packet 511 and a subsequent received start-of-frame packet 513.

One of ordinary skill in the art will understand that although transmission of start-of-frame packets in a high-speed connection is illustrated and discussed above, similar issues may arise and may be handled in similar ways while transmitting keep-alive signals in a low-speed connection, start-of-frame packets in a full-speed connection, ITP packets in a SuperSpeed connection, and/or any similar timing signal in any similar connection.

In some embodiments, the downstream facing port 204 may predict a rate at which to generate timing signals based on at least a connection speed. For example, if the downstream facing port 204 detects that a low-speed connection has been negotiated, the downstream facing port 204 may transmit keep-alive signals to the USB device 108 at 1 ms intervals upon detecting a first keep-alive signal from the upstream facing port 202. As another example, if the downstream facing port 204 detects that a full-speed connection has been negotiated, the downstream facing port 204 may transmit start-of-frame packets to the USB device 108 at 1 ms intervals upon detecting a first start-of-frame packet from the upstream facing port 202. As yet another example, if the downstream facing port 204 detects that a high-speed connection has been negotiated, the downstream facing port 204 may transmit start-of-frame packets to the USB device 108 at 1 ms intervals and microframe start-of-frame packets to the USB device 108 at 125 μs intervals upon detecting a first start-of-frame packet from the upstream facing port 202.

Though simply transmitting timing signals at a predicted rate instead of a received rate may be adequate to establish a reliable connection between the downstream facing port 204 and the USB device 108, it may not accurately reflect the rate at which timing signals are generated by the host 102. Since the host 102 may generate the timing signals at any speed within a margin of error specified by the USB Specifications, the actual intervals between the generated timing signals may not be exactly 1 ms or 125 μs, and may not remain steady throughout the lifetime of the connection.

Accordingly, in some embodiments, the downstream facing port 204 may monitor the timing signals received from the upstream facing port 202, and may alter the rate of generation of timing signals by the downstream facing port 204 based on an analysis of the time of receipt of the timing signals from the upstream facing port 202. As one example, the downstream facing port 204 may measure an elapsed time between consecutive received start-of-frame packets from the upstream facing port 202, and may alter the rate at which timing signals are generated by the downstream facing port 204 based on an average elapsed time between consecutive received start-of-frame packets. In some embodiments, a moving average duration may be determined based on a predetermined number of previously received start-of-frame packets. If the moving average duration increases, the rate at which timing signals are generated by the downstream facing port 204 is decreased. If the moving average duration falls, the rate at which timing signals are generated by the downstream facing port 204 is increased.

In some embodiments, the downstream facing port 204 may measure and modify elapsed time between start-of-frame packets, and may extrapolate timing for microframe start-of-frame packets generated therebetween. In some embodiments, the downstream facing port 204 may measure and modify elapsed time between all start-of-frame packets, including microframe start-of-frame packets.

In some embodiments, the analysis of the time of receipt of the timing signals may be performed using mathematical computations other than averages, such as computing a median duration, computing a mode duration, predicting a duration using Bayesian techniques, and/or any other suitable technique.

One of ordinary skill in the art will understand that the timing delays illustrated herein are exemplary, and are used for ease of discussion only. Furthermore, the timing delays illustrated in FIGS. 4 and 5 may not be drawn to scale. In other words, actual differences in timing intervals introduced by variable latency over the network 90 may be either more or less than those illustrated herein.

Figure 6A:
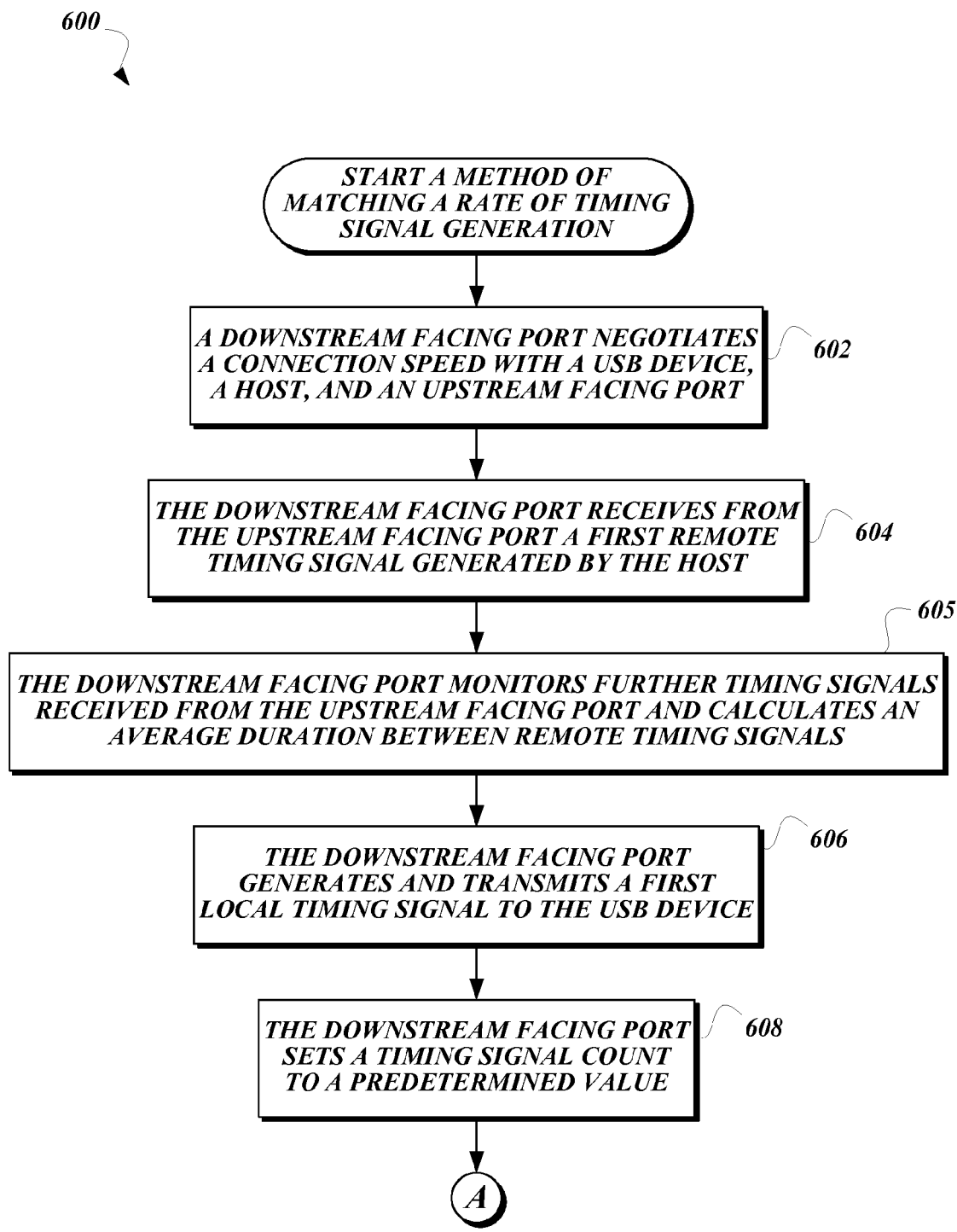
FIGS. 6A-6B are a flowchart that illustrates one embodiment of a method of matching a rate of timing signal generation according to various aspects of the present disclosure.
Figure 6B:
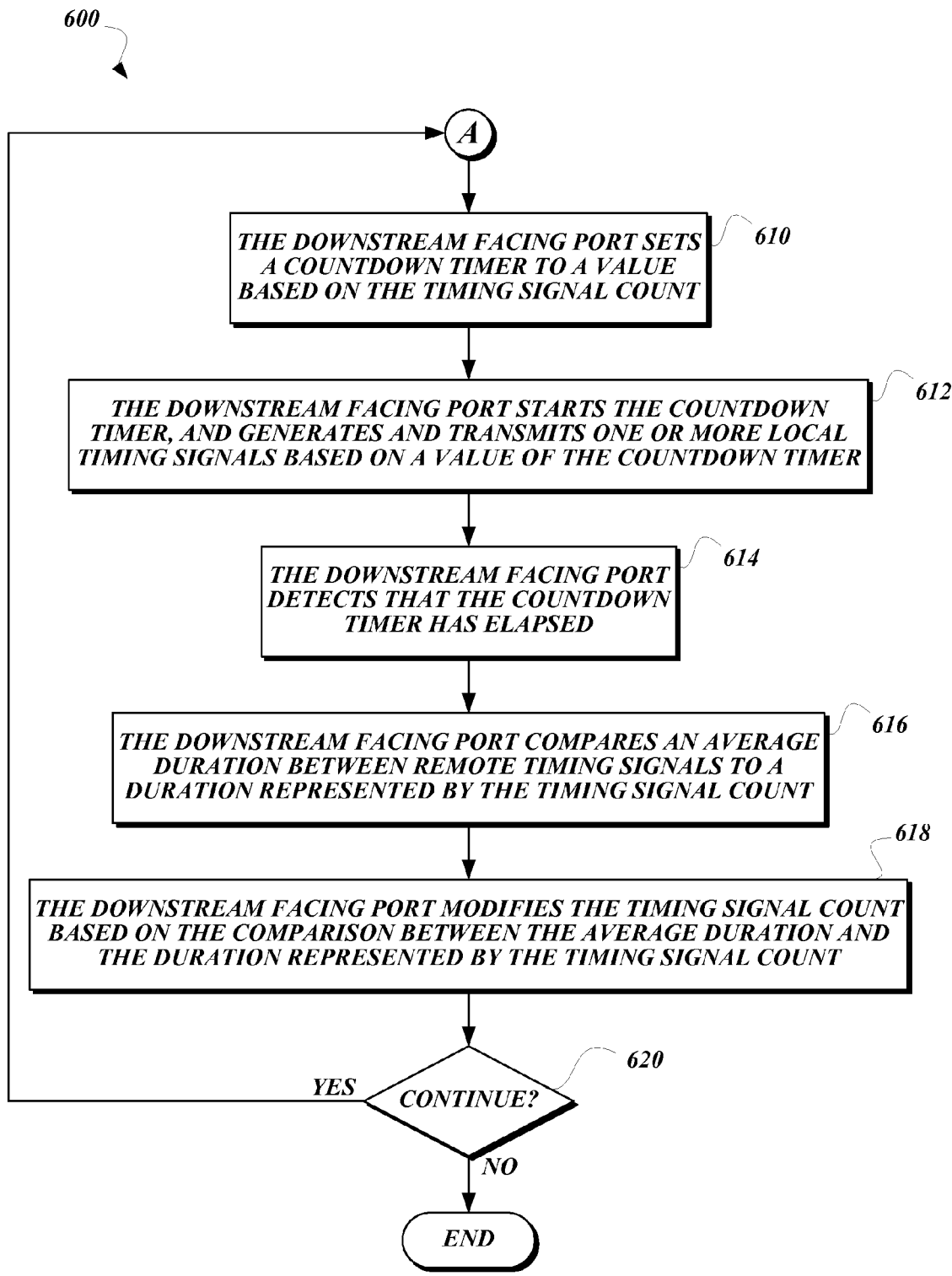

FIGS. 6A-6B are a flowchart that illustrates one embodiment of a method 600 of matching a rate of timing signal generation according to various aspects of the present disclosure. From a start block (FIG. 6A), the method 600 proceeds to block 602, where a downstream facing port 204 negotiates a connection speed with a USB device 108, a host 102, and an upstream facing port 202. In some embodiments, the connection speed may be one of low speed, full speed, high speed, SuperSpeed, or any other connection speed supported by the USB Specifications. Further details of connection speed negotiation may be found in commonly owned, co-pending U.S. patent application Ser. No. 13/229,583, which is incorporated herein by reference in its entirety for all purposes.

At block 604, the downstream facing port receives from the upstream facing port 202 a first remote timing signal generated by the host 102. As discussed above, the remote timing signal may be a keep-alive signal, a start-of-frame packet, an ITP, or any other suitable timing signal generated by the host 102. At block 605, the downstream facing port 204 monitors further timing signals received from the upstream facing port 202 and calculates an average duration between timing signals. One of ordinary skill in the art will recognize that this monitoring may take place while other steps described herein are also taking place concurrently, and may continue to take place throughout the execution of the method 600.

At block 606, the downstream facing port 204 generates and transmits a first local timing signal to the USB device 108. The type of signal generated and transmitted may be determined based on the negotiated connection speed, a type of the first remote timing signal, and/or in any other suitable way. In some embodiments, this transmission may occur soon or immediately after the first remote timing signal is received by the downstream facing port 204.

At block 608, the downstream facing port 204 sets a timing signal count to a predetermined value. In some embodiments, the predetermined value may be chosen to represent a number of system clock cycles that are expected to pass before the next timing signal is generated. For example, in some embodiments, a system clock of the downstream facing port 204 may operate at 60 MHz. If a timing signal is expected to be generated every 1 ms according to the negotiated connection speed, the timing signal count may be set to 60,000. These values are exemplary only, and in some embodiments, other clock speeds or expected timings could be used. The method 600 then proceeds to a continuation terminal ("terminal A").

From terminal A (FIG. 6B), the method 600 proceeds to block 610, where the downstream facing port 204 sets a countdown timer to a value based on the timing signal count. Next, at block 612, the downstream facing port 204 starts the countdown timer, and generates and transmits one or more local timing signals based on a value of the countdown timer. In some embodiments, the countdown timer may be decremented by one for each system clock cycle. For example, if the system clock of the downstream facing port 204 operates at 60 MHz and the countdown timer is initially set to 60,000 as described above, and the negotiated connection speed is full speed, the downstream facing port 204 may generate and transmit one start-of-frame packet to the USB device 108 once the countdown timer reaches zero (thereby indicating that 1 ms has passed). As another example, if the negotiated connection speed is high speed, the downstream facing port 204 may generate and transmit one start-of-frame packet to the USB device 108 once the countdown timer reaches zero (thereby indicating that 1 ms has passed), and may generate and transmit a microframe start-of-frame packet to the USB device 108 every time the countdown timer is decremented by 7500 (thereby indicating that 125 μs have passed, assuming the same clock frequency and initial countdown timer setting discussed above).

At block 614, the downstream facing port 204 detects that the countdown timer has elapsed. Next, at block 616, the downstream facing port 204 compares an average duration between remote timing signals to a duration represented by the timing signal count. As discussed above, the downstream facing port 204 continually monitors timing signals received from the upstream facing port 202 and determines the average duration. If the duration represented by the timing signal count is longer than the determined average duration, the timing signals generated by the downstream facing port 204 are being generated slower than the average duration between received timing signals. If the duration represented by the timing signal count is shorter than the determined average duration, the timing signals generated by the downstream facing port 204 are being generated faster than the average duration between received timing signals. Either state may indicate that the timing signal count should be altered to be closer to the average duration.

At block 618, the downstream facing port 204 modifies the timing signal count based on the comparison between the average duration and the duration represented by the timing signal count. If it was determined that the duration represented by the timing signal count is longer than the average duration, the timing signal count may be decreased by a predetermined amount. If it was determined that the duration represented by the timing signal count is shorter than the average duration, the timing signal count may be increased by a predetermined amount. In some embodiments such as the embodiments described above having a clock frequency of 60 MHz and a timing signal count initially set to 60,000, the predetermined amount by which the timing signal count is incremented or decremented may be 1. In other words, if it is determined that the timing signal count of 60,000 should be incremented, the new timing signal count will be 60,001. Likewise, if it is determined that the timing signal count of 60,000 should be decremented, the new timing signal count will be 59,999. In such embodiments, the duration between timing signals generated and transmitted by the downstream facing port 204 may change no more than 16.6 ns per 1 ms, thereby altering the duration while complying with the USB Specifications. In some embodiments, the predetermined amount may be greater than one, and/or the predetermined increment amount may be different from the predetermined decrement amount.

Next, at decision block 620, a test is performed to determine if the method 600 should continue. In most cases, the method 600 should continue at least while the downstream facing port 204 continues to receive timing signals from the upstream facing port 202. If the answer to the test at decision block 620 is YES, the method 600 returns to terminal A, and the new timing signal count value is used in the subsequent actions. If the answer to the test at decision block 620 is NO, the method 600 proceeds to an end block and terminates.

As will be appreciated by one skilled in the art, the specific routines described above in the flowcharts may represent one or more of any number of processing strategies such as event-driven, interrupt-driven, multi-tasking, multi-threading, and the like. As such, various acts or functions illustrated may be performed in the sequence illustrated, in parallel, or in some cases omitted. Likewise, the order of processing is not necessarily required to achieve the features and advantages, but is provided for ease of illustration and description. Although not explicitly illustrated, one or more of the illustrated acts or functions may be repeatedly performed depending on the particular strategy being used. Further, these figures may graphically represent code to be programmed into a computer readable storage medium associated with a computing device.

While illustrative embodiments have been illustrated and described, it will be appreciated that various changes can be made therein without departing from the spirit and scope of the invention as claimed. For example, one of ordinary skill in the art will recognize that, in some embodiments, communication technologies other than USB that exchange timing signals may use similar techniques for synchronizing timing signal generation rates.

The embodiments of the invention in which an exclusive property or privilege is claimed are defined as follows:

1. A computing device configurable to provide a downstream facing port (DFP) for allowing a USB device to communicate with a host via an upstream facing port (UFP), wherein the DFP is configured to:
   receive a first remote timing signal from the UFP;
   transmit local timing signals to the USB device at a predetermined rate; and
   adjust the rate of transmission of local timing signals to the USB device based on further timing signals received from the UFP without determining a round-trip latency between the UFP and the DFP;
   wherein adjusting the rate of transmission of local timing signals includes:
     determining an average duration between reception of remote timing signals from the UFP; and
     adjusting the rate of transmission based on the determined average duration.

2. The computing device of claim 1, wherein the predetermined rate is based on a connection speed negotiated between the host, the UFP, the DFP, and the USB device.

3. The computing device of claim 1, wherein transmitting local timing signals at a predetermined rate includes:
   setting a timing signal count to a predetermined value;
   setting a countdown timer based on the timing signal count; and
   transmitting one or more local timing signals based on a value of the countdown timer.

4. The computing device of claim 3, wherein transmitting local timing signals at a predetermined rate further includes:
   detecting that the countdown timer has elapsed; and
   resetting the countdown timer based on the timing signal count.

5. The computing device of claim 4, wherein adjusting the rate of transmission based on the determined average duration includes modifying the timing signal count based on the determined average duration.

6. The computing device of claim 5, wherein modifying the timing signal count based on the determined average duration comprises:

incrementing the timing signal count by a predetermined amount upon determining that the average duration is longer than a duration represented by the timing signal count; and decrementing the timing signal count by a predetermined amount upon determining that the average duration is shorter than a duration represented by the timing signal count.

7. The computing device of claim 1, wherein the DFP is further configured to establish a communication link with the UFP using a communication protocol other than a USB protocol.

8. The computing device of claim 1, wherein the computing device is configured to communicate with the USB device using one or more of a USB 1.0-compatible protocol; a USB 1.1-compatible protocol; a USB 2.0-compatible protocol; a USB 3.0-compatible protocol; or a protocol that is backward-compatible with USB 1.0, USB 1.1, USB 2.0, or USB 3.0.

9. The computing device of claim 1, wherein the local timing signals include keep-alive signals.

10. The computing device of claim 1, wherein the local timing signals include start-of-frame packets.

11. The computing device of claim 10, wherein the local timing signals include microframe start-of-frame packets.

12. The computing device of claim 1, wherein the local timing signals include isochronous timestamp packets.

13. A method of generating local timing signals, the method comprising:

receiving, by a first computing device configurable to provide a downstream facing port, a first remote timing signal from a second computing device configurable to provide an upstream facing port;

generating local timing signals at a predetermined rate; and adjusting the rate of transmission of local timing signals based on further received remote timing signals without determining a round-trip latency between the first computing device and the second computing device, wherein adjusting the rate of transmission of local timing signals includes:

determining an average duration between reception of remote timing signals; and adjusting the rate of transmission based on the determined average duration.

14. The method of claim 13, wherein generating local timing signals at a predetermined rate includes basing the predetermined rate on a timing signal count.

15. The method of claim 14, wherein adjusting the rate of transmission based on the determined average duration comprises:

incrementing the timing signal count upon determining that the average duration is longer than a duration represented by the timing signal count; and decrementing the timing signal count by a predetermined amount upon determining that the average duration is shorter than a duration represented by the timing signal count.

16. The method of claim 14, wherein basing the predetermined rate on a timing signal count comprises setting a countdown timer to a value of the timing signal count.

17. The method of claim 16, wherein generating local timing signals at a predetermined rate includes generating local timing signals based on a value of the countdown timer.

18. The method of claim 13, wherein the local timing signals are one or more of a keep-alive signal, a start-of-frame packet, a microframe start-of-frame packet, and a isochronous timestamp packet.

* * * * *